United States Patent [19]

Mantovaara et al.

[11] Patent Number: 4,913,684
[45] Date of Patent: Apr. 3, 1990

[54] AUTOMATIC VARIABLE TRANSMISSION FOR VEHICLES

[75] Inventors: Urpo Mantovaara, Tampere; Jouko Niemi, Helsinki, both of Finland

[73] Assignee: Variped Oy, Helsinki, Finland

[21] Appl. No.: 288,258

[22] PCT Filed: Jun. 17, 1987

[86] PCT No.: PCT/FI87/00082

§ 371 Date: Feb. 2, 1989

§ 102(e) Date: Feb. 2, 1989

[87] PCT Pub. No.: WO87/07932

PCT Pub. Date: Dec. 30, 1987

[30] Foreign Application Priority Data

Jun. 17, 1986 [FI] Finland .................................. 862578

[51] Int. Cl.⁴ ............................................. F16H 11/02
[52] U.S. Cl. ........................................ 474/12; 474/17
[58] Field of Search ................. 474/11, 12, 17, 19, 474/20, 32, 35, 36, 39, 41; 74/866–869

[56] References Cited

U.S. PATENT DOCUMENTS

| 2,478,289 | 8/1949 | Lemon | 474/20 |
| 2,711,103 | 6/1955 | Miner | 474/19 |
| 2,779,203 | 1/1957 | Eubanks | 474/28 |
| 4,403,974 | 9/1983 | Sherman et al. | 474/17 X |
| 4,504,247 | 3/1985 | Chana et al. | 474/17 |
| 4,547,178 | 10/1985 | Hayakawa et al. | 474/11 |
| 4,585,430 | 4/1986 | Gaddi | 474/12 |
| 4,589,858 | 5/1986 | Gaddi | 474/12 |

FOREIGN PATENT DOCUMENTS

| 93896 | 10/1896 | Fed. Rep. of Germany . |
| 224180 | 12/1909 | Fed. Rep. of Germany . |
| 72378 | 1/1987 | Finland . |
| 75035 | 12/1987 | Finland . |

Primary Examiner—Thuy M. Bui
Attorney, Agent, or Firm—Barnes & Thornburg

[57] ABSTRACT

A variable transmission automatically changing its transmission ratio in accordance with the resistance to propagation of the vehicle, in which the force-transmitting transmission link is a V-belt (1) or equivalent and in which at least the secondary pulley consists of cup disks (2,3) urged against each other and interconnected with a multiple-end screw (4,5) and a compression spring (7). As taught by the invention, the compression spring (7) is at the same time a torsion spring, and its initial position is settable at assembly or adjustable.

9 Claims, 2 Drawing Sheets 4,913,684

AUTOMATIC VARIABLE TRANSMISSION FOR VEHICLES

BACKGROUND OF THE INVENTION

The present invention concerns a variable transmission which automatically changes its transmission ratio in accordance with the resistance to propagation of the vehicle and in which the power-transmitting transmission link is a V-belt or equivalent, and wherein at least the secondary pulley consists of cup disks urged against each other and interconected with a multiple-end screw and a compression spring, which at the same time is a torsion spring and is so settable adjustable in connection with assembly or adjustable that the torsion effect of the spring can increase or decrease the screw force urging the cup disks together which is caused by the moment of the peripheral force acting from the belt on the axially displaceable cup disk.

An automatic variable transmission for a bicycle is known in the art for instance through the reference DE PS 93896, the principle of the transmission therein disclosed being that the pulleys for the flat belt serving as transmission link are made of helical leaf springs which in the secondary pulley are curved in the direction of rotation and in the primary pulley, against it. this principle has later been applied in several references, for instance supplementing or replacing the springs with levers moving in helical grooves. A drawback of transmissions of this type are pulley designs which are complex and involve friction and are sensitive to dust and dirt.

A torque-sensing V-belt pulley is known in the art for instance through the reference DE PS 224180, where, to be sure, the pressure effect of the cup disk rotating with reference to the other half with screw juncture only serves to boost the lever control acting on both belt pulleys. V-belt pulleys consisting of cup disks which are non-rotatable in relation to each other have been tried out in the first place in drives for auxiliary apparatus of internal combustion engines, such as charging generators and fans, where compression or torsion springs also occur in addition to threads. A design of this kind is for instance disclosed in the reference USP 2,478,289.

The object of the present invention is to eliminate the above drawbacks. The variable transmission of the invention automatically changing transmission ratio in accordance with the resistance to propagation of the vehicle is characterized in that the torque on the shaft of the secondary belt pulley is controllable while driving with a particular cylinder which pushes the cup disks of the belt pulley apart, applying a force the stronger the higher the pressure in the cylinder. The object of the invention is to provide a variable transmission which in all circumstances automatically and steplessly changes its transmission ratio and which is competitive in efficiency with a chain transmission, and which has not been achieved so far in spite of endeavours.

An advantageous embodiment of the variable transmission of the invention in which the power-transmitting transmission link is a V-belt or equivalent and in which at least the secondary pulley consists of cup disks urged against each other and interconnected with a multiple-end screw and a compression spring is characterized in that the screw with at least three ends interconnecting the cup disks of the secondary V-belt pulley is a ball screw.

An advantageous embodiment of the variable transmission of the invetnion wherein the primary pulley is fixed is characterized in that pressure increase in the cylinder pushing the cup disks of the secondary belt pulley apart increases the tension of the V-belt with the aid of a cylinder acting on the jockey pulley.

An advantageous embodiment of the variable transmission of the invention in which also the primary pulley is adjuatable is characterized in that the same pressurized fluid which pushes apart the cup disks of the secondary pulley urges together the cup disks in the primary pulley.

An advantageous embodiment of the variable transmission of the invention for use on a bicycle is also characterized in that the pressure control means is placed on the handle-bar of the bicycle and provided with a pressure gauge.

An advantageous embodiment of the variable transmission of the invention for a motor-driven vehicle, in which the cup disks of the primary belt pulley are urged together by action of springs and of a cylinder containing pressurized fluid is also characterized in that the pressure control of the pressurized fluid has been connected to the control system of the engine.

An advantageous embodiment of the variable transmission of the invention is also characterized in that at least one surface touching the side of the belt on the pulleys transmitting power is grooved in a manner known in itself in the art.

An advantageous embodiment of the variable transmission of the invention is also characterized in that the curved shape of the grooving approximates an evolvent.

An advantageous embodiment of the variable transmission of the invention is also characterized in that in the flow passage of the pressurized fluid is provided an adjustable resistance check valve known in itself in the art, with the aid of which the movement of the cup disks of the secondary belt pulley away from each other can be retarded when the torque goes down.

SUMMARY OF THE INVENTION

The variable transmission of the invention comprises a thread sensing the torque on the shaft, but the design differs from those known in the art in that here are at least two effective spring systems and both are either settable or adjustable while driving.

Although the present invention primarily concerns the secondary pulley, of which the control retardation is generally, and in bicycles in particular, advantageously accomplished in that a rotation is associated with the axial control movement of the cup disks, the throttling of the flow of the fluid just mentioned and its adjustment aid in making the movement of the cup disks of the secondary pulley away from each other properly fast and smooth when the resistance to propagation of the vehicle decreases.

The object of the present invention is to provide a variable transmission in which the bearings of the secondary pulley which automatically changes its transmission ratio and the idling clutch are standard products from specialized factories and are available in various sizes. Hereby the secondary pulley of the variable transmission is well suited to be manufactured also in small series and to be used not only on bicycles of different sizes but also in motor-driven vehicles, such as mopeds and motorcycles.

BRIEF DESCRIPTION OF THE DRAWING

The invention is described in the following more in detail with the aid of an example, referring to the drawings attached, in which.

DESCRIPTION OF THE PREFERRED EMBODIMENTS

Figure 1:
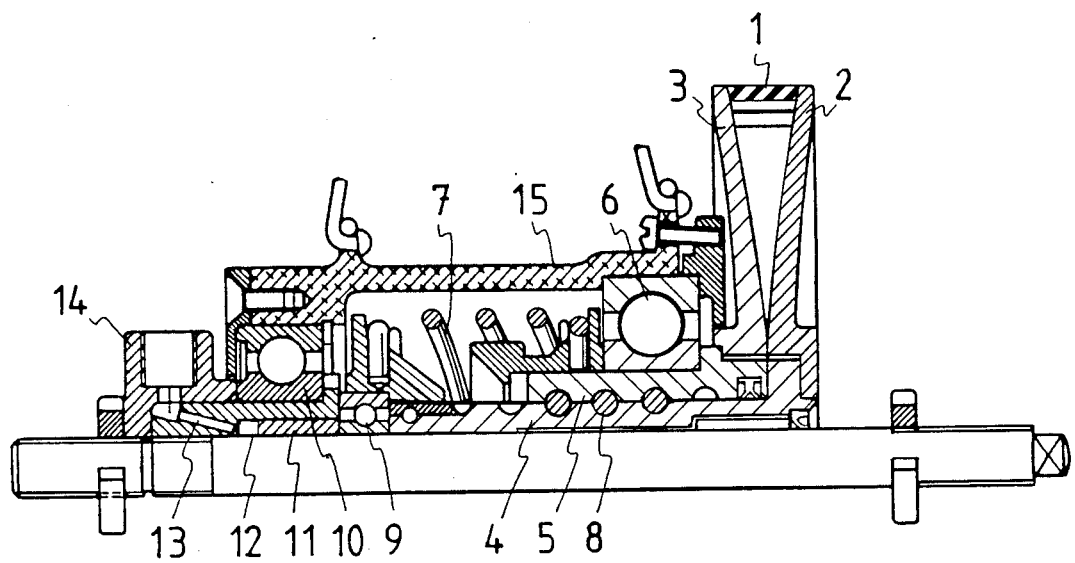
FIG. 1 presents, in rear view, the section of a wheel hub.

To begin with, the variable transmission of the invention changing automatically its transmission ratio in accordance with the resistance to propagation of the vehicle shall be considered on the basis of FIG. 1. FIG. 1 presents in rear view the section of a wheel hub. The power-transmitting transmission link in the variable transmission is a V-belt 1 or equivalent, and at least the secondary pulley consists of cup disks 2 and 3 urged against each other and which are interconnected with a multiple-end screw 4 and 5, for instance a ball screw, and with a compression spring 7. The compression spring 7 is at the same time also a torsion spring and its initial position is settable at assembly or adjustable. Half of the peripheral force of the belt 1 acting as the transmission link goes to the inner cup disk 3 and from there to the threaded sleeve 5 and, further, through a ball-bearing idling clutch 6 to the cover 15 of the wheel hub. The other half of the peripheral force transmitted from the V-belt 1 to the outer cup disk 2 and to the screw sleeve 4 provides the screw force which urges the cup disks 2 and 3 together. The torque of the screw sleeve 4 goes to the threaded sleeve 5 by two routes: partly through the balls 8 of the control thread and partly through a compression/torsion spring. The compression force of the spring 7 tends to bring the cup disks closer together and thus to reduce the friction torque, which is small in itself, to be sure, in a ball thread.

The peripheral force of the belt 1 with which the disks 2 and 3 are urged together depends on the pitch of the control thread, on the rigidity of the compression/-torsion spring, on the torque adjustment setting and on the pressure in the control cylinder 11-13, which is appropriately made adjustable while driving, by the aid of a control means preferably mounted on the handle-bar and provided with a pressure gauge.

Figure 3:
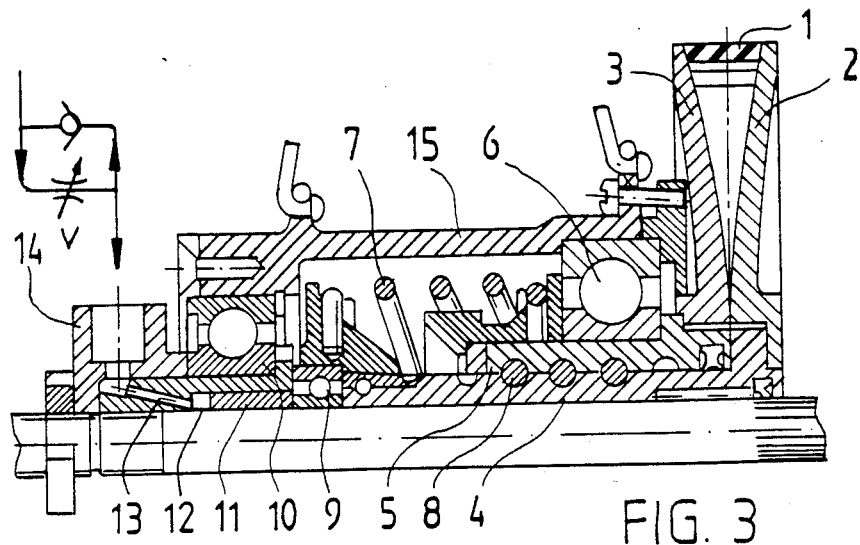
FIG. 3 presents in rear view the section of a wheel hub and, schematically, an adjustable resistance check valve with which the incoming flow of pressurized oil to the control cylinder can be retarded.
Figure 4:
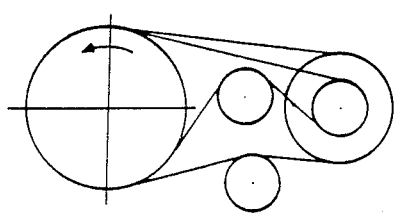
FIG. 4 presents schematically, in both extreme positions, a transmission of which the primary pulley is fixed and round in shape.
Figure 6:
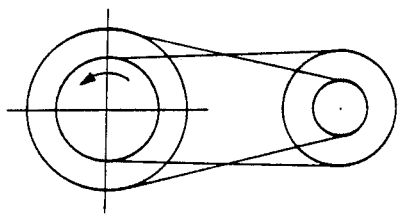
FIG. 6 presents schematically a transmission wherein the primary pulley is an adjustable pulley round in shape.
Figure 5:
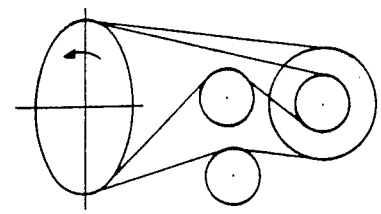
FIG. 5 presents schematically and in both extreme positions a transmission wherein the primary pulley is fixed and oval in shape.
Figure 7:
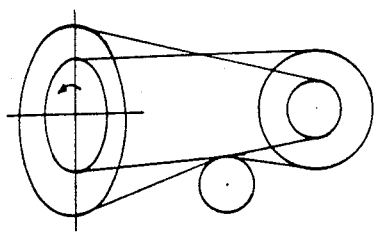
FIG. 7 presents schematically a transmission wherein the primary pulley is an oval-shaped adjustable pulley.

FIG. 4 presents schematically, in both extreme positions, a transmission in which the primary pulley is fixed and round in shape. The straight arrow indicates the direction of the pedal force and the curved arrow, the direction of rotation. In the transmission shown in FIG. 5, the primary pulley is fixed and oval in shape. In FIG. 6 the primary pulley is a round and in FIG. 7, an oval adjustable pulley. In bicycles, and in vehicles operated by muscular force in general, the primary pulley may be a fixed pulley or an adjustable pulley. In the case of an adjustable pulley, the primary pulley changes the radius of its contact ring inversely compared with the secondary pulley. The primary pulley may also be oval in shape. In a transmission comprising an oval primary pulley, a jockey pulley equalizing the length of the belt 1 is needed also in the case that both belt pulleys which transmit power are adjustable pulleys. If in a variable bicycle transmission the primary pulley is also adjustable and the transmission is required to operate flexibly without jockey roller, an adjustable resistance check valve V such as has been depicted in the schematic FIG. 3, in which a section of the wheel hub is presented in rear view, is required in the flow paths of the control cylinders both of the primary and secondary pulley, said valve being usable to retard the inflow of pressurized oil into the control cylinder. At the same time, the movement of the disks 2 and 3 away from each other is retarded when the torque goes down.

The torque on the shaft of the secondary belt pulley can be adjusted while driving with a particular cylinder 2 which pushes the cup disks 2 and 3 of the secondary pulley apart wih a force which is the greater the higher the pressure in the cylinder 2. If the primary pulley is fixed, increasing pressure in the cylinder pushing the cup disks 2 and 3 of the secondary belt pulley apart increases the tension of the V-belt 1 with the aid of a cylinder acting on the jockey pulley. If also the primary pulley is adjustable, the same pressurized fluid which pushes apart the cup disks 2 and 3 in the secondary pulley may urge the cup disks of the primary pulley together. The pressure control means for the pressurized fluid may in a bicycle be mounted on the handle-bar and provided with a pressure gauge.

In the secondary pulley, unidirectional throttling of the control oil is as a rule needed for retarding the movement of the cup disks away from one another as the resistance to propagation decreases. In the primary pulley of a bicycle transmission unidirectional throttling may be applied to prevent continuous adjustments repeated on every revolution, caused by jerky pedalling.

If the adjustment carried out while driving is hydraulically implemented, the effect of pressure change should in general be opposite in the primary and secondary pulleys, that is, pressure rise should in the primary pulley cause the cup disks to be urged together if it causes movement of the disks away from each other in the secondary pulley.

A maximally flexible control system is achieved in a bicycle with compressed air, which is transformed with the aid of pressure transformers into oil pressure only in the immediate adjacency of the transmission pulleys. When the adjustable spring suspension system is a liquid or air spring suspension or a combination of both, excessively rapid control movements can be prevented by means of a throttle.

Inconveniences encountered in a deficiently operating control may be alleviated by using a tension roller, which is usually indispensable in a variable bicycle transmission having a fixed primary pulley, because changing axle base is difficult to implement.

In the functioning of the tension roller, too, best results are obtained with a combination of spring force dependent on position and pressure force dependent on the resistance to propagation.

Figure 2:
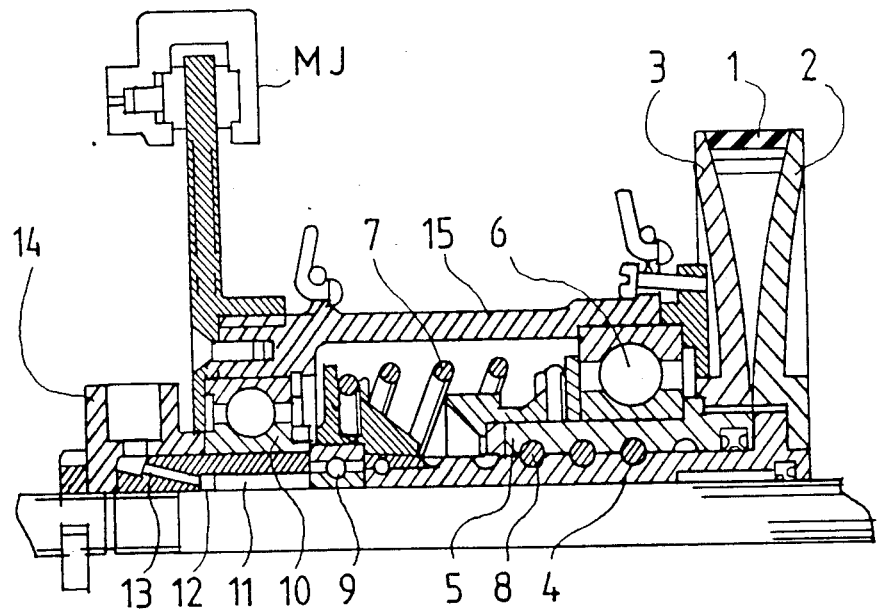
FIG. 2 presents in rear view the section of a wheel hub and the placement of a disk brake on the wheel hub of a motor-driven vehicle.

In a motor-driven vehicle, the secondary pulley of FIG. 1 may be connected with a primary pulley of which the cup disks are urged together for instance by the combined effect of spring force and oil pressure. Instead of one or the other, or additionally to both, it is possible to use a high-pitch thread on the primary pulley, which urges the cup disks together with increasing torque. Pressurized oil control is usually easy to connect to the control system of the engine, and it is invariably an easier task to achieve a well-functioning control in a motor-driven vehicle than on a bicycle. A conceivable location for the brake MJ in motor-driven equipment has been shown in FIG. 2.

The properties and control facilities described in the foregoing are sufficient to guarantee reliable operation and good efficiency, provided that the belt is flexible and has sufficient rigidity against tension and lateral compression and that it has been manufactured to be uniform enough in quality and dimensionally accurate.

In very dirty conditions or in rain some slipping may still occur, and such is best counteracted by providing one of the contact surfaces of the secondary pulley with spiral grooves. Such grooving may also be used for higher efficiency and in order to reduce the belt wear if the spiral configuration is made to approximate an evolvent, as disclosed in the Finnish patent application No. 853430.

The reliability and precision in operation of the variable transmission may also be improved by further developing the control system. Modern electronics, pick-up technique and hydraulics offer opportunities which are becoming better, and developing, all the time.

It is obvious to a person skilled in the art that various embodiments of the invention are not exclusively confined to the example presented in the foregoing and that they may vary within the scope of the claims stated below.

We claim:

1. Variable transmission for automatically changing a transmission ratio thereof in accordance with a resistance to propagation of a vehicle, in which a force-transmitting link is a V-belt and in which at least a secondary pulley consists of cup disks being urged towards each other and interconnected with a multiple-end screw and a compression spring, wherein the screw is a ball screw having at least three ends for connecting the cup disks of the secondary V-belt pulley.

2. A transmission for automatically changing a transmission ratio thereof in accordance with a resistance to propagation of a vehicle, in which a power-transmitting transmission link is a V-belt and in which at least a secondary pulley consists of cup disks urged against each other and interconnected with a multiple-end screw and a compression spring, said spring being at the same time also a torsion spring and so settable in conjunction with assembly, or adjustable, that a torsion effect of the spring may increase or decrease a screw force urging the cup disks together which is caused by a moment of a peripheral force acting from the belt on an axially displaceable cup disk, wherein the torque on a shaft of the secondary belt pulley, while driving, is adjustable with a particular cylinder which pushes the cup disks of the belt pulley apart with a force which is the greater than a pressure in the cylinder resulting from a pressurized fluid.

3. Variable transmission according to claim 2, in which a primary pulley is fixed, wherein pressure increase in the cylinder pushing the cup disks of the secondary belt pulley apart increases the tension of the V-belt with the aid of a cylinder acting on a jockey pulley.

4. Variable transmission according to claim 2, in which also a primary pulley is adjustable, the same pressurized fluid which pushes apart the cup disks of the secondary pulley urges the cup disks together in a primary pulley.

5. A variable transmission for a bicycle according to claim 4, wherein the pressure control means for the pressurized fluid is mounted on a handlebar of a bicycle and provided with a pressure gauge.

6. A variable transmission for a motor-driven vehicle according to claim 4, in which the cup disks of the primary belt pulley are urged together by effect of springs and of a cylinder containing pressurized fluid, wherein a pressure control of the pressurized fluid is connected to an engine control system.

7. Variable transmission according to claim 2, wherein at least one of surfaces touching a side of the belt on the first and second pulleys is grooved.

8. Variable transmission according to claim 7, wherein a curved shape of the grooving approximates an equivalent.

9. Variable transmission according to claim 2, wherein in a flow passage for the pressurized fluid is provided an adjustable resistance check valve, with the aid of which movement of the cup disks of the secondary belt pulley away from each other is retarded when a torque goes down.

* * * * *